United States Patent [19]

Diamantoglou

[11] Patent Number: 4,981,960
[45] Date of Patent: Jan. 1, 1991

[54] MODIFIED CELLULOSE FOR BIOCOMPATIBLE DIALYSIS MEMBRANES IV AND PROCESS FOR PREPARATION THEREOF

[75] Inventor: Michael Diamantoglou, Erlenbach, Fed. Rep. of Germany

[73] Assignee: Akzo N.V., Arnhem, Netherlands

[21] Appl. No.: 315,835

[22] Filed: Feb. 27, 1989

[30] Foreign Application Priority Data

Feb. 25, 1988 [DE] Fed. Rep. of Germany ....... 3805973

[51] Int. Cl.$^5$ .......................... C08B 3/04; C08B 3/26; C08B 11/02; C08B 15/05
[52] U.S. Cl. ........................................ 536/56; 536/58; 536/59; 536/61; 536/62; 536/63; 536/64; 536/65; 536/66; 536/67; 536/68; 536/69; 536/81; 536/82; 536/83; 536/84; 536/85; 536/86; 536/88; 536/89; 536/90; 536/91; 536/93; 536/95; 536/97; 536/98; 536/99; 536/100; 536/101
[58] Field of Search ........................ 536/20, 56, 58, 59, 536/61-69, 81-101, 124-126

[56] References Cited

U.S. PATENT DOCUMENTS

| | | | |
|---|---|---|---|
| 2,759,925 | 8/1956 | Hiatt et al. | 260/225 |
| 2,856,399 | 10/1958 | Mench et al. | 260/224 |
| 3,505,312 | 4/1970 | Malon et al. | 260/325 |
| 3,745,202 | 7/1973 | Riggleman et al. | 264/41 |
| 4,278,790 | 7/1981 | McCormick | 536/84 |
| 4,590,265 | 5/1986 | Bogan et al. | 536/63 |
| 4,708,951 | 11/1987 | Inagaki et al. | 514/57 |

FOREIGN PATENT DOCUMENTS

| | | |
|---|---|---|
| 1720087 | 6/1971 | Fed. Rep. of Germany . |
| 2300496 | 7/1973 | Fed. Rep. of Germany . |
| 2705735 | 5/1982 | Fed. Rep. of Germany . |
| 3246417 | 6/1984 | Fed. Rep. of Germany . |
| 3312922 | 10/1984 | Fed. Rep. of Germany . |
| 3410133 | 10/1985 | Fed. Rep. of Germany . |
| 3524596 | 1/1987 | Fed. Rep. of Germany . |
| 210288 | 6/1984 | German Democratic Rep. . |
| 60-203265 | 3/1984 | Japan . |

OTHER PUBLICATIONS

134 *Carbohydrate Research* 305-312 (1984).
24 *Kidney International* 764-769 (1983).
7 *Asaio-Journal* 44-49 (1984).
Chemical Abstract: vol. 74, 1971, pp. 105, Ref. 65813g.
Chemical Abstract: vol. 98, 1983, p. 345, Ref. 22307f.
Chemical Abstract: vol. 102, 1985, p. 62, Ref. 167988g.
Chemical Abstract: vol. 103, 1985, p. 120, Ref. 8399c.
Chemical Abstract: vol. 107, 1987, p. 95, Ref. 98428w.
Chemical Abstract: vol. 107, 1987, p. 110, Ref. 79805a.
48 *Chem. Engineering News* 66-67 (1970).
Jp 61 212302 A. In: Patents Abstract of Japan, Sect. C, vol. 11, 1987, No. 47, (C-403).

*Primary Examiner*—Merrell C. Cashion, Jr.
*Assistant Examiner*—C. Azpuru
*Attorney, Agent, or Firm*—Oliff & Berridge

[57] ABSTRACT

A modified cellulose for biocompatible dialysis membranes having a structure represented by the formula

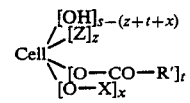

wherein Cell is cellulose or chitin, in each case without hydroxyl groups, s=3 in the case of cellulose and s=2 in the case of chitin, R' is $CH_3$ and/or $C_2H_5$ and/or $C_3H_7$, X denotes specified functional groups, R" is H or R, Z corresponds to the following groups of atoms: SR", $SO_3H$ and salts thereof, SO-R, $SONR''_2$, $SO_2$-R, $SO_2NR''_2$, $SO_2H$ and salts thereof, F, Cl, Br, I, $NR''_2$, $PR''_2$, $PO_3H_2$ and salts thereof, $PO_2H(OR)$, $PO(OR)_2$, $PO_2HR''$ and salts thereof, POR"(OR) and $POR''_2$, x+t=0.75 to 2.85, t=0 to 2.85, x=0 to 2.85, and z=0.01 to 0.45. A process for preparation of the cellulose derivatives is also disclosed.

5 Claims, No Drawings

MODIFIED CELLULOSE FOR BIOCOMPATIBLE DIALYSIS MEMBRANES IV AND PROCESS FOR PREPARATION THEREOF

TECHNICAL FIELD

The invention relates to cellulose derivatives which are suitable for the manufacture of biocompatible dialysis membranes.

BACKGROUND

U.S. Pat. No. 4,278,790 discloses cellulose solutions using lithium chloride and dimethyl acetamide as solvent. The solutions can contain up to 8% of lithium chloride and up to about 3% of cellulose. It is also possible to prepare cellulose derivatives in these cellulose solutions. According to this patent, the solutions are prepared by introducing cellulose into a mixture of dimethyl acetamide and lithium chloride and initially heating the mixture at about 150° C. for an extended period. Subsequently, the solution which has then formed is cooled to room temperature, while stirring.

In addition, German Offenlegungsschrift No. 3,312,022 and German Offenlegungsschrift No. 3,246,417 disclose cellulose ester filaments which are insoluble in water. They have an extremely high adsorptive capacity for water and physiological fluids. This may be an advantage for some areas of use but for many it is a disadvantage.

The cellulose acetate phthalates known from U.S. Pat. Nos. 2,759,925, 2,856,399 and 3,505,312 have high phthaloyl content and in salt form are water-soluble and therefore unsuitable as membrane materials. If the products are not in the salt form, they are insoluble in water and accordingly are also insoluble in the solvents which contain the usual hydrophilic additives and which are usual for membrane formation.

U.S. Pat. No. 3,745,202 and West German Offenlegungsschrift No. 2,300,496 describe processes for preparation of asymmetric membranes of cellulose derivatives having ester and/or ether groups.

U.S. Pat. No. 4,590,265 describes the products formed by oxidation of cellulose esters with ozone. The cellulose products synthesized by oxidation of cellulose or cellulose derivatives always had poor biocompatibility regardless of the oxidizing agent.

German Pat. No. 2,705,735 discloses a dialysis membrane for hemodialysis, having antithrombogenic compounds chemically bonded thereto, the dialysis membrane consisting of two or more layers of a cellulose regenerated from cuprammonium cellulose solution, each of which has been obtained from separately fed orifices of a spinneret, which cellulose contains chemically bonded substances having antithrombogenic activity.

Japanese Patent Application No. 60-203,265 describes high molecular weight cellulose products for the preparation of medical instruments with anticoagulant properties. Such products are mixtures of polycationic and polyanionic cellulose derivatives, and are usually obtained by mixing appropriate polymer solutions. Such water-insoluble salts are unsuitable as membrane materials, since the danger is always present that they will be transformed by salt-interchange effects into a compound which is water-soluble or which swells greatly in water.

However, it has also been proposed in German Offenlegungsschrift No. 1,720,087 that by reacting the polymeric material of the membrane with an alkyl halide and then reacting the resulting material with an alkali metal salt of an antithrombogenic compound having a cationic residue (for example, heparin or a heparinoid compound) the risk of blood coagulation is diminished. The possible alkyl halides in this context also include haloalkyldialkylamines. Cellulose, and most importantly cellulose acetate, are among the possible polymers.

An antithrombogenic effect of these known dialysis membranes is observed only when the degree of substitution of the modified cellulose is high, i.e., greater than at least 0.1, and a preheparinization with a relatively high heparin concentration (0.1 to 1% by weight solution) is carried out in a separate stage.

German Offenlegungsschrift No. 3,524,596 discloses a dialysis membrane with improved biocompatibility, which is distinguished in that the mean degree of substitution of a modified cellulose is 0.02 to 0.07. The known dialysis membrane composed of modified cellulose preferably contains such a modified cellulose which has a structure represented by the formula

cellulose—R'—X—Y where
X represents —NR"— and/or —N+R"$_2$— and/or —SO— and/or —SO— and/or —SO$_2$— and/or —CO—NR— and/or —CO—O— and/or —O—,
Y represents —R and/or —NR$_2$ and/or —Si(OR")$_3$ and/or —SO$_3$H and/or —COOH and/or —PO$_3$H$_2$ and/or —N+HR"$_2$ and the salts thereof,
R' represents an alkylene group and/or cycloalkylene group and/or arylene group having a total of 1 to 25 C atoms,
R" represents a hydrogen atom or R, and
R represents an alkyl group having 1 to 5 C atoms and/or a cycloalkyl group and/or aryl group.

This known dialysis membrane is capable of reducing to a considerable extent blood coagulation, leukopenia and complement activation. However, no noteworthy extent of adsorption of beta-2-microglobulin has been achieved.

German Patent Application No. P. 3,723,897.3 describes cellulose derivatives having the general formula

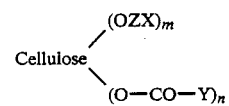

$$\text{Cellulose} \begin{cases} (OZX)_m \\ (O-CO-Y)_n \end{cases}$$

in which —Z— denotes an alkylene, alkenylene, alkynylene, cycloalkylene or benzylene or xylylene radical which may or may not be substituted,
X denotes —H, —NR$_2$, —N+R$_3$, —CN, —COOH, —SO$_3$H, —PO(OR)$_2$, —CONR$_2$ or —Si(OR)$_3$, where R denotes a hydrogen atom or an alkyl or alkenyl group having 1 to 25 C atoms, or a cycloalkyl, toluyl or phenyl group, and
Y is an alkyl, alkenyl or alkynyl group, which may or may not be substituted, having 1 to 36 C atoms, a cycloalkyl group or a phenyl, toluyl or benzyl group or a

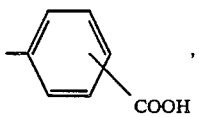 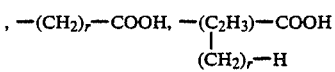

or (—CH=CH—COOH) or NH—R radical and R has the same meaning, and
r=1-20,
m=0-2.5,
n=0.2 to 2.95,
with the proviso that, where m=0, n>1.55 when Y is an alkyl radical having 1-5 C atoms, a —(CH$_2$-)$_r$—COOH, radical with r=0, 1 or 2 or a radical of phthalic acid, and the degree of polymerization is more than 400, and which can be prepared by homogeneous reaction in a mixture of dimethyl acetamide and/or N-methylpyrrolidone with LiCl after activation of the cellulose starting material without the presence of LiCl, the preparation thereof and the use thereof for membranes and filaments.

Apart from the circumstance that dialysis membranes composed of synthetic or natural polymers can, when used in artificial kidneys, very easily induce blood coagulation, which is substantially prevented by appropriate drug treatment, in the case of dialysis membranes composed of regenerated cellulose there is frequently a transient fall in leukocytes in the first period of dialysis treatment when a kidney patient is treated with dialyzers having cellulose membranes. This effect is called leukopenia. Leukopenia is a reduction in the number of leukocytes (white blood corpuscles) in the circulating blood. The number of white blood corpuscles in humans is about 4,000 to 12,000 cells/mm$^3$.

Leukopenia associated with dialysis is most pronounced 15 to 20 min after the start, it being possible for the neutrophils (which are the leukocytes which can be stained with neutral or simultaneously with acidic and basic dyes) to disappear almost completely. Subsequently, the number of leukocytes recovers again within about one hour to almost the initial level or exceeds it.

If, after the leukocytes have recovered, a new dialyzer is connected, leukopenia occurs again to the same extent.

Cellulose membranes cause pronounced leukopenia. Even though the clinical significance of leukopenia has not been scientifically eludicated, there is nevertheless a desire for a dialysis membrane for hemodialysis which does not exhibit the leukopenic effect, without this adversely affecting the other very desired properties of dialysis membranes composed of regenerated cellulose.

During hemodialysis using membranes composed of regenerated cellulose, beside the leukopenia there has also been found a distinct complement activation. The complement system within the blood serum is a complex plasma-enzyme system which consists of many components and acts in various ways to prevent damage due to invading foreign cells (bacterial etc.). When antibodies against the invading organism are present, there can be complement-specific activation by the complex of the antibodies with antigenic structures of the foreign cells, otherwise complement activation takes place by an alternative pathway due to special surface features of the foreign cells. The complement system is based on a multiplicity of plasma proteins. After activation, these proteins react specifically in a defined sequence with one another and, finally, a cell-damaging complex which destroys the foreign cell is formed.

Individual components release peptides which induce inflammatory manifestations and occasionally can also have undesired pathological consequences for the organism. It is assumed that in the case of hemodialysis membranes composed of regenerated cellulose the activation takes place by the alternative pathway. These complement activations are detected objectively by determination of the complement fragments C3a and C5a.

In this context, reference is made to the following studies: D. E. Chenoweth et al., 24 *Kidney International* pages 746 et seq. (1983) and D. E. Chenoweth, 7 *Asaio-Journal* pages 44 et seq. (1984).

The carpal tunnel syndrome is affected by modified cellulose derivatives. Yet, there is a considerable need for further modifications of the cellulose in order to eliminate this phenomenon too as completely as possible.

An object of the present invention is to provide modified cellulose which, in terms of leukopenia, complement activation and blood coagulation, confers optimum properties on membranes and furthermore, is able to adsorb to a considerable extent the beta-2-microglobulin which is responsible for the carpal tunnel effect.

SUMMARY OF THE INVENTION

In one aspect, the present invention relates to a modified cellulose wherein the modified cellulose has a structure represented by the formula

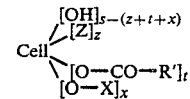

wherein
Cell is the framework of an unmodified cellulose molecule or of a chitin molecule, in each case without hydroxyl groups;
s=3 in the case of the unmodified cellulose molecule and s=2 in the case of the chitin molecule;
R' is at least one member selected from the group consisting of CH$_3$, C$_2$H$_5$ and C$_3$H$_7$;
X is at least one member selected from the group consisting of CO—R, CS—R, CO—CR'$_2$—CO—CHR"$_2$, CO—OR, CONH—R, CONR"R, CSNH—R, CSNR"R, SO$_2$—R, SO$_2$NR"R, SO—R, SONR"R, PO$_3$H$_2$, a salt of PO$_3$H$_2$, PO$_2$R"R, POR"$_2$, PO(OR")$_2$, CR"$_2$—CR"(OH)—R, CR"$_2$—CR"(-SH)—R, CR"$_2$—CR"$_2$—NHR, R—COOH, a salt of R—COOH, R—SO$_3$H, a salt of R—SO$_3$H, R, CH$_2$—CH$_2$—NR"$_2$, and CH$_2$—CH$_2$—SO$_2$—R;
R is selected from the group consisting of alkyl, alkenyl, alkynyl, each of which is straight-chain or branched, unsubstituted, substituted by D, or the carbon chain is interrupted by a member selected from the group consisting of O, S, N, P or Si, Co—, and COO- groups, cycloalkyl which is unsubstituted by D, or contains a heteroatom selected from the group consisting of O, S, N, P and Si, arylalkyl, arylalkenyl, arylalkynyl, each of which is unsubstituted, substituted by D, or is interrupted by at least one heteroatom selected from the group consisting of O, S, N, P and Si, a bisaryl radical which is unsubstituted or substituted by D, a radical of a condensed aromatic compound which is unsubstituted or substituted by D, a radical of a heterocyclic compound which is unsubstituted or substituted by D, and aryl;

D is a member selected from the group consisting of R, $-NR''_2$, $-N^+R''_3$, $-COOH$ or a salt of $-COOH$, $-COOR''$, $-CONR''_2$, $-CO-R''$, $-CSOH$, a salt of $-CSOH$, $-CSOR''$, $-CSNR''_2$, $-SO_3H$, a salt of $-SO_3H$, $-SO_3R''$, $SO_2NR''_2$, $-SR''$, $-SOR''$, $-SONR''_2$, $-PO_3H_2$, a salt of $-PO_3H_2$, $-PO(OR'')_2$, $-PO_2H(NR''_2)$, $-PO(NR''_2)_2$, $-PO_2H_2$, $-POH(OR'')$, $-CN$, $-NO_2$, $-OR''$, halogen, and $-Si(OR'')_3$;

Z is selected from the group consisting of $SR''$, $SO_3H$, a salt of $SO_3H$, $SO-R$, $SONR''_2$, $SO_2-R$, $SO_2NR''_2$, $SO_2H$, a salt of $-SO_2H$, F, Cl, Br, I, $NR''_2$, $PR''_2$, $PO_3H_2$, a salt of $PO_3H_2$, $PO_2H(OR)$, $PO(OR)_2$, $PO_2HR''$, a salt of $-PO_2HR''$, $POR''(OR)$ and $POR''_2$;

R" is H or R;
$x+t = 0.75$ to $2.85$;
$t = 0$ to $2.85$;
$x = 0$ to $2.85$
$z = 0.01$ to $0.45$.

The present invention also relates to a process for preparation of a modified cellulose, wherein deoxycellulose derivatives with a degree of substitution of 0.05 to 0.45 are reacted with a member selected from the group consisting of acid chlorides, acid anhydrides, acids, esters, ketenes, diketenes, chloroformic acid esters, carbonic acid diesters, 2.5diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides, phosphoric acid anhydride, phosphonic acid anhydrides, phosphonic acid chlorides, phosphorous acid, phosphinic acid anhydrides, ethylene oxide, ethylene sulfide, ethyleneimino, lactone, sultone, cleavable onium compounds, alkylaminoethanol sulfate esters, and alkylsulfonethanol sulfate esters.

DETAILED DESCRIPTION OF THE PREFERRED EMBODIMENTS

As summarized above, the objects of the present invention are achieved by a modified cellulose, wherein the modified cellulose has a structure represented by the formula

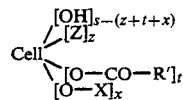

wherein
Cell is a framework of an unmodified cellulose molecule or of a chitin molecule, in each case without hydroxyl groups, $s=3$ in the case of the unmodified cellulose molecule and $s=2$ in the case of the chitin molecule;
R' is $CH_3$ and/or $C_2H_5$ and/or $C_3H_7$;
X is $CO-R$ and/or $CS-R$ and/or $CO-CR'_2-CO-CHR_2$ and/or $CO-OR$ and/or $CONH-R$ and/or $CONR''R$ and/or $CSNH-R$ and/or $CSNR''R$ and/or $SO_2-R$ and/or $SO_2NR''R$ and/or $SO-R$ and/or $SONR''R$ and/or $PO_3H_2$ or a salt thereof and/or $PO_2R''R$ and/or $POR''_2$ and/or $PO(OR'')_2$ and/or $CR''_2-CR''(OH)-R$ and/or $CR''_2-CR''(SH)-R$ and/or $CR''_2-CR''_2-NHR$ and/or $R-COOH$ of a salt thereof and/or $R-SO_3H$ or a salt thereof and/or R and/or $CH_2-CH_2-NR''_2$ and/or $CH_2-CH_2-SO_2-R$;

R is an alkyl and/or alkenyl and/or alkynyl (straight-chain and/or branched, which may or may not be substituted, the carbon chain also being able to be interrupted by heteroatoms such as O, S, N, P or Si as well as by CO- or COO-groups) and/or cycloalkyl (which may or may not contain heteroatoms and/or may or may not be substituted) and/or aryl and/or arylalkyl and/or arylalkenyl and/or arylalkynyl (which may or may not contain heteroatoms and/or may or may not be substituted) and/or bisaryl radical (which may or may not be substituted) and/or radical of a condensed aromatic compound (which may or may not be substituted) and/or radical of a heterocyclic compound (which may or may not be substituted);

By "substituted", there are meant, in addition to radicals in the sense of R, also the following groups:
$-NR''_2$, and/or $N^+R''_3$, and/or $-COOH$ or a salt thereof, and/or $-COOR''$, and/or $-CONR''_2$, and/or $-CO-R''$, and/or $-CSOH$ or a salt thereof, and/or $-CSOR''$, and/or $-CSNR''_2$, and/or $-SO_3H$ or a salt thereof, and/or $-SO_3R''$, and/or $-SO_2NR''_2$, and/or $-SR''$, and/or $-SOR''$, and/or $-SONR''_2$, and/or $-PO_3H_2$ or a salt thereof, and/or $-PO(OR'')_2$, and/or $-PO_2H(NR''_2)$, and/or $-PO(NR''_2)_2$, and/or $-PO_2H_2$, and/or $-POH(OR'')$, and/or $-CN$, and/or $-NO_2$, and/or $-OR''$, and/or halogen, and/or $-Si(OR'')_3$;

Z corresponds to the following groups of atoms: $SR''$, $SO_3H$ and salts thereof, $SO-R$, $SONR''_2$, $SO_2-R$, $SO_2NR''_2$, $SO_2H$ and salts thereof, F, Cl, Br, I, $NR''_2$, $PR''_2$, $PO_3H_2$ and salts thereof, $PO_2H(OR)$, $PO(OR)_2$, $PO_2HR''$ and salts thereof, $POR''(OR)$ and $POR''_2$;

R" is H or R;
$x+t = 0.75$ to $2.85$;
$t = 0$ to $2.85$;
$x = 0$ to $2.85$;
$z = 0.01$ to $0.45$.

Preferably the degree of polymerization is 100 to 500, especially 150 to 350.

When $x+t = 1.10$ to $2.35$, modified cellulose are obtained which are characterized by exhibiting a pronounced reduction of the C5a activation.

Preferably $z = 0.05$ to $0.40$.

The subject matter of the invention is also a process for preparation of the modified celluloses according to the invention, wherein deoxycellulose derivatives with a degree of substitution of 0.05 to 0.45 are reacted with acid chlorides and/or acid anhydrides and/or acids and/or esters and/or ketenes and/or diketenes and/or chloroformic acid esters and/or carbonic acid diesters and/or 2.5-diketooxazolidines and/or isatinic anhydride and/or isocyanates and/or carbamoyl chlorides and/or thiocyanates and/or thiocarbamoyl chlorides and/or sulfonyl chlorides and/or sulfonic acid anhydrides and/or N-chlorosulfonamides and/or sulfinic acid chlorides and/or N-chlorosulfinamides and/or phosphoric acid anhydride and/or phosphonic acid anhydrides and/or phosphonic acid chlorides and/or phosphorous acid and/or phosphinic acid anhydrides and/or ethylene oxide and/or ethylene sulfide and/or ethyleneimino and/or lactone and/or sultone and/or cleavable onium compounds and/or alkylaminoethanol sulfate esters and/or alkylsulfonethanol sulfate esters.

Preferably celluloses having the general formula shown below and substituted according to the invention are used:

| Cell—S—R″ | or Cell —F | or Cell—PR″$_2$ |
|---|---|---|
| Cell—SO$_3$—H | or Cell—Cl | or Cell—PO$_3$H$_2$ |
| (and salts thereof) | or Cell—Br | (and salts thereof) |
| Cell—SO—R | or Cell—I | or Cell—PO$_2$H(OR) |
| Cell—SONR″$_2$ | | or Cell—PO(OR)$_2$ |
| Cell—SO$_2$—R | | or Cell—PO$_2$HR″ |
| Cell—SO$_2$NR″$_2$ | | (and salts thereof) |
| Cell—SO$_2$H | | or Cell—POR″(OR) |
| (and salts thereof) | | or Cell—POR″$_2$ |
| or Cell—NR″$_2$ | | |

The complement activation within the scope of the present invention was assessed on the basis of the C5a fragments. For this purpose, 300 ml of heparinized blood plasma was recirculated in vitro through a dialyzer with an effective exchange area of 1 m$^2$ at a plasma flow rate of 100 ml/min for a period of 4 hours. The C5a fragments in the plasma were determined using the RIA method (Upjohn assay). The relative complement activation for the particular time of measurement was calculated as a percentage by forming the ratio of the concentration at the time of sampling with the initial value. The measurement after a recirculation time of 4 hours was used for the evaluation. Flat membranes were incubated with heparinized blood plasma for 3 hours and then the C5a fragments were determined.

The increase in the beta-2-microglobulin level in long-term dialysis patients is observed after use of membranes composed of regenerated cellulose and is attributed to these membranes being less permeable to substances in the molecular weight range 1,000 to 20,000 and the microglobulins thus being removed to an insufficient extent during the dialysis. Beta-2-microglobulin is not adsorbed to a noteworthy extent onto customary membranes composed of regenerated cellulose. However, the cellulose derivatives according to the invention can contribute in an unexpected manner to this.

The beta-2-microglobulin content adsorbed onto the membrane is measured within the scope of the invention in the following manner.

10 ml of human blood plasma are added to each 500 mg of substance (dialysis membrane) and incubated at 37° C. for 30 minutes. The human blood plasma contains 13.67 mg/liter of beta-2-microglobulin. The sample is centrifuged at 3,000 r.p.m. for 15 minutes. The beta-2-microglobulin content in the supernatant is determined. The sample is then washed 2 times with 10 ml of phosphate-buffered saline each time. The microglobulin content in the washings is also determined. The percentage amount of beta-2-microglobulin adsorbed can be calculated from the difference between the original and the unabsorbed beta-2-microglobulin.

The average degree of polymerization DP was determined in a cupriethylenediamine solution by the DIN 54270 method.

The degree of etherification and/or degree of esterification were determined on the basis of the analytical results which are known and typical for the substituents, for example nitrogen by the Kjeldahl method, sulfur by the Schöniger method or phosphorus by the molybdate method, where appropriate from the difference between before and after saponification.

EXAMPLES

The Examples set forth below illustrate the practice and advantages of the present invention. As Examples, they are illustrative only, and should not be construed to limit the allowable scope of protection available to the Applicant in any way whatsoever.

EXAMPLE 1

(A) Reaction of cellulose with p-toluenesulfonyl chloride 486 g (3 mole) of cellulose (DP=1400, measured in cupriethylenediamine solvent) were suspended in 6000 ml of pyridine (anhydrous) in a 10 liter flask. Thereafter 171.45 g (0.9 mole) of p-toluenesulfonyl chloride were added and the mixture was stirred at 25° C. for 48 hours. The reaction product was suction-filtered, washed successively with ethanol, water and ethanol and dried in a vacuum oven at 65° C. This procedure yielded 565 g of a product having a sulfur content of 3.03%, corresponding to a degree of esterification of 0.18.

(B) Reaction of cellulose toluenesulfonate ester with 2-mercaptosuccinic acid 150 ml of ethanol and 27 g (0.18 mole) of 2-mercaptosuccinic acid were placed in a mixer and neutralized with a solution of 50.4 g (0.90 mole) of potassium hydroxide in 150 ml of water. Thereafter 189.72 g (1 mole) of the previously obtained ester were added and the mixture was heated at 80° C. for 8 hours. The resulting product was washed with water, aqueous hydrochloric acid solution and ethanol, and dried in a vacuum oven at 65° C. This procedure yielded 173 g of a product having a sulfur content of 1.65%, corresponding to a degree of substitution of z=0.09.

(C) Acetylation 35.06 g (0.2 mole) of the product obtained in B were suspended in a mixture of 300 ml of methylene chloride, 40.4 g (0.64 mole) of acetic acid and 112.3 g (1.1 mole) of acetic anhydride in a 1 liter three-necked flask. Thereafter 1.0 g (0.01 mole) of perchloric acid dissolved in 10 g (0.16 mole) of acetic acid were slowly added dropwise. In the process, the temperature rose to 45° C. After 1.5 hours a clear viscous solution was formed. After addition of 1.47 g (0.015 mole) of potassium acetate, the methylene chloride was distilled off, and the reaction product was precipitated and washed with methanol and dried in a vacuum oven at 60° C. This procedure yielded 50.5 g of a product having the following specifications:

| Content of acetyl groups: | t = 2.25 |
|---|---|
| Content of mercaptosuccinic acid groups: | z = 0.08 |
| Degree of polymerization: | DP = 260 |

For the flat membranes prepared from this product by known methods, the reduction in C5a compared with the unmodified cellulose membrane is 95%.

EXAMPLE 2

54 g (0.72 mole) of aminoacetic acid and 200 ml of water were placed in a mixer. After neutralization of the amino acid with a solution of 50.4 g (0.90 mole) of potassium hydroxide in 100 ml of water, 189.72 g (1 mole) of the ester of Example 1A were added and the mixture was stirred at 80° C. for 8 hours. The reaction product was washed with water and ethanol and dried in a vacuum oven at 65° C.

| Yield: | 167 g |
|---|---|
| N content: | 0.7% |
| Degree of substitution: | z = 0.085 |

By acetylation in analogy to Example 1C, a product having the following specifications was obtained:

| Content of acetyl groups: | t = 2.30 |
|---|---|
| Content of carboxymethylamino groups: | z = 0.08 |

For membranes of this cellulose derivative, the reduction in C5a compared with the unmodified cellulose is 90%.

EXAMPLE 3

In analogy to Example 12A, diethylaminoethyl cellulose p-toluenesulfonate ester with the following specification was prepared by reaction of diethylaminoethylcellulose having a low degree of substitution with p-toluenesulfonyl chloride:

| Degree of etherification: | 0.04 |
|---|---|
| Degree of esterification | 0.10 |

In analogy to Example 1B, a cellulose derivative with an S content of 0.94% (DS=0.05) and an N content of 0.3% (DS=0.037) was obtained by reaction of the ester with 3-mercaptopropionic acid in the presence of KOH, and was then acetylated as in Example 1C. The resulting product had the following specifications:

| Content of acetyl groups: | t = 2.05 |
|---|---|
| Content of diethylaminoethyl groups: | x = 0.035 |
| Content of mercaptopropionic acid groups: | z = 0.046 |

For membranes prepared therefrom, the reduction in C5a compared with the unmodified cellulose is 97%.

EXAMPLES 4-10

In analogy to Example 1 and/or 2, the cellulose derivatives listed in the Table were synthesized. Membranes prepared therefrom by known processes also exhibited excellent biocompatibility properties compared with unmodified celluloses.

TABLE

| Example No. | Z | z | R" | t | X | x |
|---|---|---|---|---|---|---|
| 4 | —SCH$_2$COOH | 0.12 | CH$_3$ | 2.15 | — | 0 |
| 5 | —PO$_3$H$_2$ | 0.07 | CH$_3$ | 2.30 | — | 0 |
| 6 | —SC$_{12}$H$_{25}$ | 0.06 | CH$_3$ | 2.20 | — | 0 |
| 7 | —NHCH(CH$_3$)COOH | 0.10 | CH$_3$ | 2.10 | — | 0 |
| 8 | —S—C$_3$H$_7$ | 0.05 | C$_2$H$_5$ | 2.05 | C$_6$H$_5$NHCO | 0.14 |
| 9 | —N(C$_2$H$_5$)$_2$ | 0.09 | C$_3$H$_7$ | 1.1 | C$_4$H$_9$NHCO | 0.5 |
| 10 | —N(CH$_3$)CH$_2$COOH | 0.05 | CH$_3$ | 2.15 | HOOCC$_2$H$_4$CO— | 0.12 |
| 11 | —SC$_2$H$_4$OH | 0.10 | CH$_3$ | 2.25 | — | — |
| 12 | —S—C$_6$H$_5$ | 0.15 | CH$_3$ | 2.32 | — | — |

What is claimed is:

1. A modified cellulose, wherein the modified cellulose has a structure represented by the formula

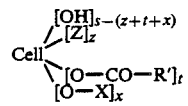

wherein

Cell is the framework of an unmodified cellulose molecule without hydroxyl groups;

s=3 in the case of the unmodified cellulose molecule;

R' is at least one member selected from the group consisting of CH$_3$, C$_2$H$_5$ and C$_3$H$_7$;

X is at least one member selected from the group consisting of CO—R, CS—R, CO—CR'$_2$—CO—CHR$_2$, CO—OR, CONH—R, CONR"R, CSNH—R, CSNR"R, SO$_2$—R, SO$_2$NR"R, SO—R, SONR"R, PO$_3$H$_2$, a salt of —PO$_3$H$_2$, PO$_2$R"R, POR"$_2$, PO(OR")$_2$, CR"$_2$—CR"(OH)—R, CR"$_2$—CR"(SH)—R, CR"$_2$—CR"—CR'$_2$—NHR, R—COOH, a salt of R—COOH, R—SO$_3$H, a salt of R—SO$_3$H, R, CH$_2$—CH$_2$—NR"$_2$, and CH$_2$—CH$_2$—SO$_2$—R;

R is selected for the group consisting of alkyl, alkenyl, alkynyl, each of which is straight-chain having a chain length of from 1 to 12 carbon atoms, unsubstituted, substituted by D, or the carbon chain is interrupted by a member selected from the group consisting of O, S, N, P, or Si, CO—, and COO-groups, cycloalky which is unsubstituted, substituted by D, or contains a heteroatom selected from the group consisting of O, S, N, P and Si, arylalkyl, arylalkenyl, arylalkynyl, each of which is unsubstituted, substituted by D, or is interrupted by at least one heteroatom selected from the group consisting of O, S, N, P or Si, a bisaryl radial which is unsubstituted or substituted by D, a radical of a condensed aromatic compound which is unsubstituted or substituted by D, a radical of a heterocyclic compound which is unsubstituted or substituted by D, and aryl;

D is a member selected from the group consisting of R, —NR$_2$, —N+R$_3$, —COOH, a salt of —COOH, —COOR", —CONR"$_2$, —CO—R", —CSOH, a salt of —CSOH, —CSOR", —CSNR"$_2$, —SO$_3$H, a salt of —SO$_3$H, —SO$_3$R", —SO$_2$NR"$_2$ —SR", —SOR", —SONR"$_2$, —PO$_3$H$_2$, a salt of —PO$_3$H$_2$, —PO(OR")$_2$, —PO$_2$H(NR"$_2$), —PO(NR"$_2$)$_2$, —PO$_2$H$_2$, —POH(OR"), —CN, —NO$_2$, —OR", halogen, and —Si(OR")$_3$;

Z is selected from the group consisting or SR", SO$_3$H, a salt of —SO$_3$H, SO—R, SONR"$_2$, SO$_2$—R, SO$_2$NR"$_2$, SO$_2$H, a salt of SO$_2$H, F, Cl, Br, I, NR"$_2$, "PR"$_2$, PO$_3$H$_2$, a salt of PO$_3$H$_2$, PO$_2$H(OR), PO(OR)$_2$, PO$_2$HR", a salt of PO$_2$HR", POR"(OR) and POR"$_2$;

R" is H or R;

x+t=0.75 to 2.85;

t=0 to 2.85;

x=0 to 2.85;

z=0.01 to 0.45.

2. A modified cellulose as claimed in claim 1, wherein the degree of polymerization is 100 to 500.

3. A modified cellulose as claimed in claim 2, wherein the degree of polymerization is 150 to 350.

4. A modified cellulose as claimed in claim 1, wherein x+t=1.10 to 2.35.

5. A modified cellulose as claimed in claim 1, wherein z=0.05 to 0.40.

* * * * *

UNITED STATES PATENT AND TRADEMARK OFFICE
CERTIFICATE OF CORRECTION

PATENT NO. : 4,981,960

DATED : January 1, 1991

INVENTOR(S) : Diamantoglou

It is certified that error appears in the above-identified patent and that said Letters Patent is hereby corrected as shown below:

On the title page, in the ABSTRACT:

line 12, after "R," insert --R''' denotes R,--

Col. 2, line 29, change "-N+R"$_2$-" to -- -$\overset{+}{N}$R"$_2$- --; after "and/or" insert -- -S- and/or--;

line 30, delete "-SO- and/or";

line 34, change "-N+HR"$_2$" to -- -$\overset{+}{N}$HR"$_2$--;

line 60, change "-N+R$_3$" to -- -$\overset{+}{N}$R$_3$".

Col. 3, line 13, change "n>1.55" to --n$\geq$1.55";

line 15, delete "," (first occurence).

Col. 5, line 7, change "-N+R"$_3$" to -- -$\overset{+}{N}$R"$_3$--;

line 32, change "2.5diketooxazolidines," to --2.5-diketooxazolidines,--.

UNITED STATES PATENT AND TRADEMARK OFFICE
CERTIFICATE OF CORRECTION

PATENT NO. : 4,981,960

DATED : January 1, 1991

INVENTOR(S) : Diamantoglou

It is certified that error appears in the above-identified patent and that said Letters Patent is hereby corrected as shown below:

Col. 6, line 22, change "N+R"$_3$" to --NR"$_3^+$--.

Col. 9, line 20, in Example 3, change "12A," to --1A,--.

IN THE CLAIMS:

Col. 10, claim 1, line 23, change "for" to --from--;

line 35, change "radial" to --radical--;

line 42, change "-NR$_2$, -N+R$_3$," to -- -NR"$_2$, -NR$_3^+$,--;

line 45, after "-SO$_2$NR"$_2$" insert --,--.

Signed and Sealed this

Twenty-fifth Day of August, 1992

Attest:

DOUGLAS B. COMER

Attesting Officer     Acting Commissioner of Patents and Trademarks